H. Nutt,
Oil Press.

N° 39,671. Patented Aug. 25, 1863.

Witnesses
W. S. Partridge
Daniel Robertson

Inventor
H. Nutt

UNITED STATES PATENT OFFICE.

HASSALL NUTT, OF BROOKLYN, NEW YORK.

IMPROVEMENT IN OIL-PRESS MATS.

Specification forming part of Letters Patent No. 39,671, dated August 25, 1863.

*To all whom it may concern:*

Be it known that I, HASSALL NUTT, of Brooklyn, in the county of Kings and State of New York, have invented a new and useful Improvement in the Manufacture of Oil-Press Mats; and I do hereby declare that the following is a full, clear, and exact description of the same, reference being had to the accompanying drawings, forming a part of this specification, in which—

Figure 1:
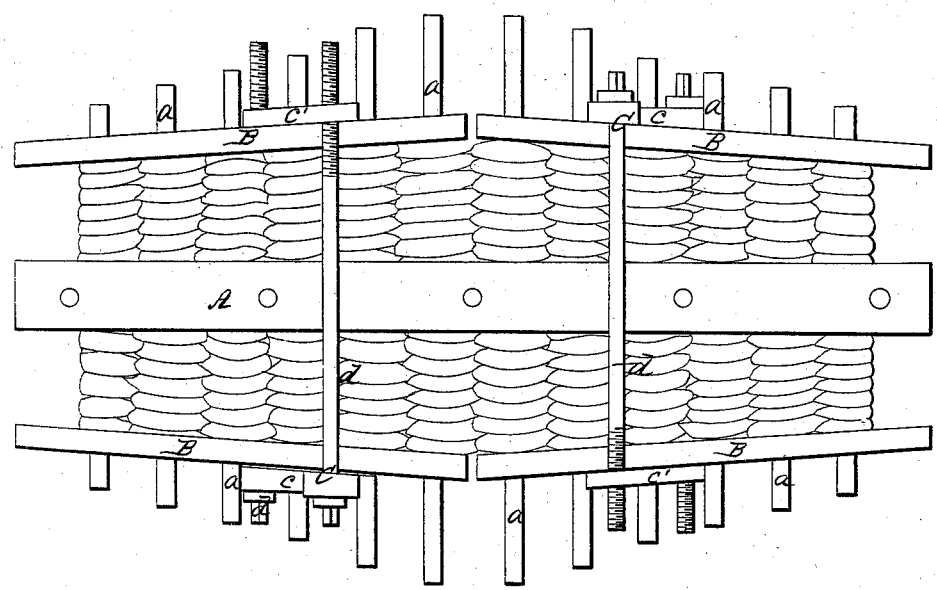
Figure 2:
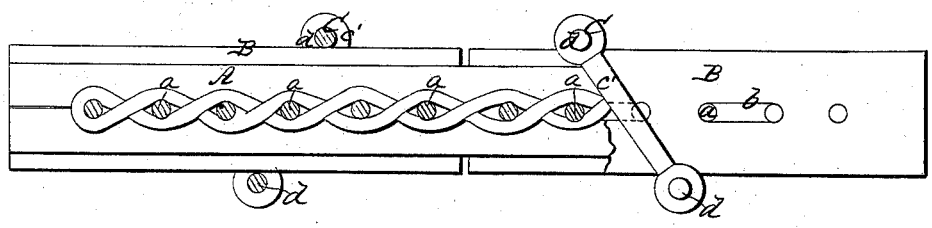

Figure 1 represents a plan or top view of my invention. Fig. 2 is a sectional side elevation of the same.

Similar letters of reference in both views indicate corresponding parts.

This invention consists in the employment or use of two or more screw-clamps in combination with movable frames and with a central clamp, which serves to hold the pins or rods which form the guides for the strands composing the mat in such a manner that the strands can be gradually and firmly compressed, and a cheap, durable, and well-finished mat can be produced with comparatively little labor or exertion.

To enable others skilled in the art to make and use my invention, I will proceed to describe it.

A represents a clamp, made of cast-iron or any other suitable material, and provided with a series of sockets to receive the transverse rods $a$. After these rods have been put in and tightened by means of the clamp the strands are braided between them in the ordinary manner.

B are frames, made of cast-iron or any other suitable material, and provided with slots or holes $b$, to fit on the ends of the rods $a$, as clearly shown in the drawings. After the strands have been braided between the rods the frames B are slipped on and the screw-clamps C are applied. These clamps consist of bars $c\ c'$, which are placed on the outside of the frames B, and which are provided with holes to admit the screws $d$. The holes in one of each pair of bars are large enough to let the screws pass freely, and the holes in the other bar are provided with a screw-thread to correspond to the threads on the ends of the screws. By screwing up the screws the frames are drawn up toward each other, and the strands are compressed between them. The central clamp, A, is now removed, and the transverse rods are withdrawn, the spaces left empty by them being filled up with cordage, and the whole mat is firmly compressed by the screw-clamps until it attains the desired solidity and firmness.

By the use of the movable clamp A, and by the application of the screw-clamps C, the manufacture of the mats is considerably facilitated, the transverse rod $a$ can be readily inserted and readily removed, and by removing the central clamp, A, the mat can be pressed up firmly, and much time and labor saved.

What I claim as new, and desire to secure by Letters Patent, is—

The employment or use, in the manufacture of oil-press mats, of the movable central clamp, A, screw-clamps C, frames B, and rods $a$, all combined and operating in the manner and for the purpose substantially as herein shown and described.

HASSALL NUTT.

Witnesses:
M. S. PARTRIDGE,
DANIEL ROBERTSON.